US008051912B2

(12) United States Patent
Layton

(10) Patent No.: US 8,051,912 B2
(45) Date of Patent: Nov. 8, 2011

(54) ARMORED FLAT CABLE SIGNALLING AND INSTRUMENT POWER ACQUISITION

(75) Inventor: James Edward Layton, Chelsea, OK (US)

(73) Assignee: Baker Hughes Incorporated, Houston, TX (US)

( * ) Notice: Subject to any disclaimer, the term of this patent is extended or adjusted under 35 U.S.C. 154(b) by 150 days.

(21) Appl. No.: 11/958,138

(22) Filed: Dec. 17, 2007

(65) Prior Publication Data

US 2008/0093922 A1 Apr. 24, 2008

Related U.S. Application Data

(63) Continuation of application No. 10/899,613, filed on Jul. 27, 2004, now abandoned.

(51) Int. Cl.
*E21B 43/00* (2006.01)
*G01V 3/00* (2006.01)

(52) U.S. Cl. ..... 166/369; 166/66.4; 166/105; 340/854.8

(58) Field of Classification Search .................. 166/369, 166/66.4, 105, 53, 250.15; 340/853.1, 854.7, 340/855.8, 854.8, 854.9
See application file for complete search history.

(56) References Cited

U.S. PATENT DOCUMENTS

| | | | | |
|---|---|---|---|---|
| 1,862,613 | A | 6/1932 | Tomoda | |
| 5,521,592 | A * | 5/1996 | Veneruso | 340/854.8 |
| 6,167,965 | B1 | 1/2001 | Bearden et al. | |
| 6,873,267 | B1 * | 3/2005 | Tubel et al. | 340/853.3 |
| 7,084,534 | B2 * | 8/2006 | Ohishi | 310/12.04 |
| 7,170,424 | B2 * | 1/2007 | Vinegar et al. | 340/855.8 |

FOREIGN PATENT DOCUMENTS

JP 356087864 A 7/1981

* cited by examiner

*Primary Examiner* — Kenneth L Thompson
*Assistant Examiner* — Yong-Suk Ro
(74) *Attorney, Agent, or Firm* — Bracewell & Giuliani LLP

(57) ABSTRACT

Measurement and/or control units located within a borehole are inductively coupled to a flat three phase power cable segment without piercing the armor around the cable. For drawing power from the cable, C-shaped, L-shaped or straight core(s) with winding(s) around at least a portion thereof are positioned proximate to one or both end conductors, outside the armor, with significantly overlapping the center conductor. For impressing or detecting signals on the cable, straight core(s) with winding(s) around at least a portion thereof are disposed on one or both sides of the cable, outside the armor, across all three conductors with the core oriented transverse to the cable conductors.

17 Claims, 3 Drawing Sheets

ARMORED FLAT CABLE SIGNALLING AND INSTRUMENT POWER ACQUISITION

CROSS-REFERENCE TO RELATED APPLICATIONS

This application is a continuation of and claims priority from U.S. patent application Ser. No. 10/899,613, filed Jul. 27, 2004, now abandoned the full disclosure of which is hereby incorporated by reference herein.

TECHNICAL FIELD OF THE INVENTION

The present invention is directed, in general, to borehole production signaling and power systems and, more specifically, to impressing signals on and drawing power from borehole production power cables without intrusive connection.

BACKGROUND OF THE INVENTION

In borehole production systems that employ artificial lift equipment such as electrical submersible pumps (ESPs), a three phase power cable transmits power downhole to the motor and pump. In addition, various schemes have been proposed for transmitting data measurement and control signals over the three phase power cable, including transmission of such data measurement and control signals concurrently with the three phase power.

Current systems for transmitting measurement and control signals over the power cable and/or powering downhole electronics from the three phase power to the pump motor typically require direct connection to the cable conductors. Such direct connection requires piercing the cable armor, creating a point at which the cable might become susceptible to attack by hostile conditions downhole.

There is, therefore, a need in the art for indirectly coupling to power cable conductors, without piercing the cable armor, in order to draw power or transmit signals.

SUMMARY OF THE INVENTION

To address the above-discussed deficiencies of the prior art, it is a primary object of the present invention to provide, for use in a borehole production system, measurement and/or control units located within a borehole that are inductively coupled to a flat three phase power cable segment without piercing the armor around the cable. For drawing power from the cable, C-shaped, L-shaped or straight core(s) with winding(s) around at least a portion thereof are positioned proximate to one or both end conductors, outside the armor, with significantly overlapping the center conductor. For impressing or detecting signals on the cable, straight core(s) with winding(s) around at least a portion thereof are disposed on one or both sides of the cable, outside the armor, across all three conductors with the core oriented transverse to the cable conductors.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms “include” and “comprise,” as well as derivatives thereof, mean inclusion without limitation; the term “or” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
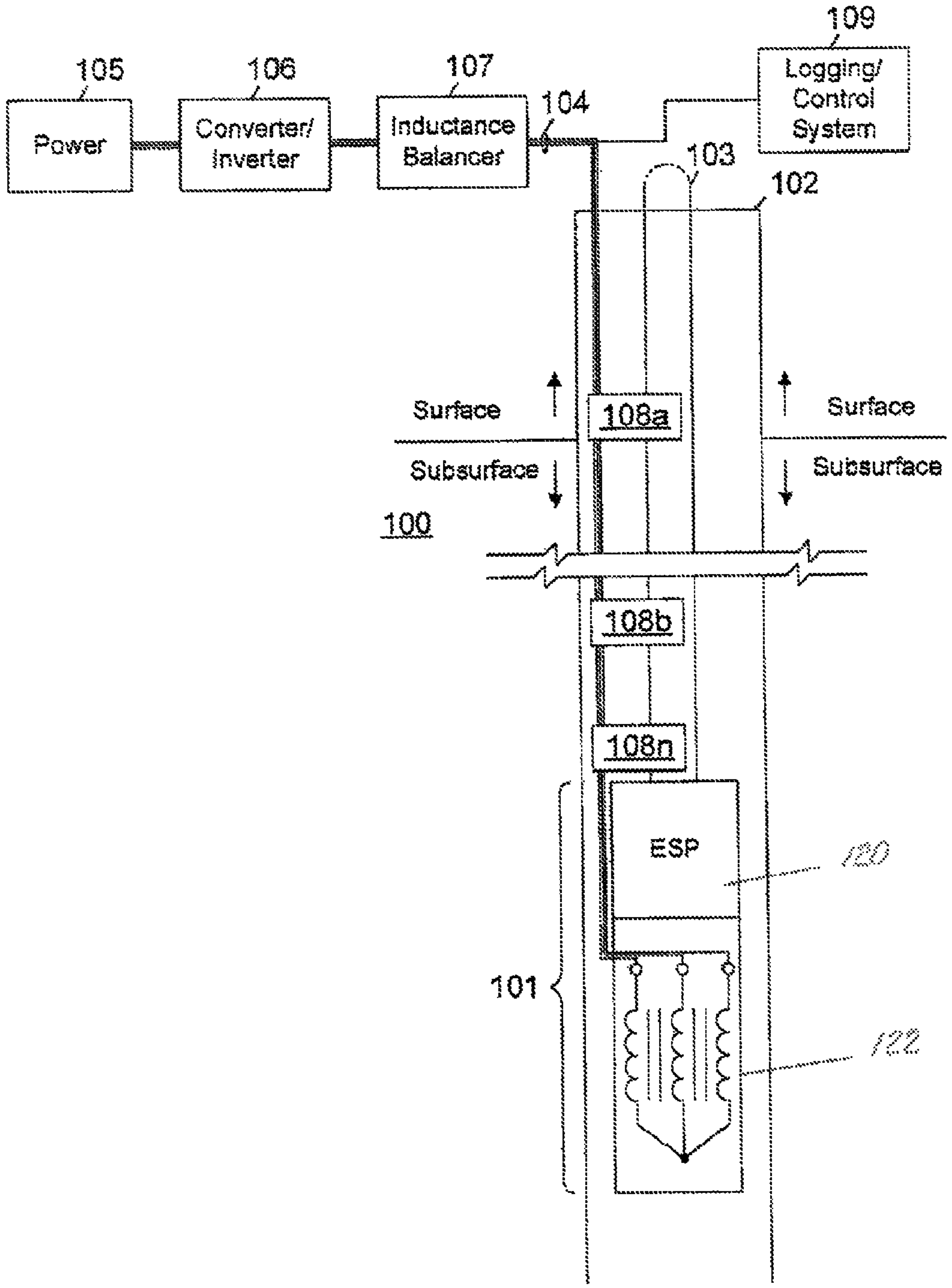
FIG. 1 depicts a borehole production system including downhole measurement and/or control units inductively coupled to a flat three phase power cable according to one embodiment of the present invention.
Figure 2A:
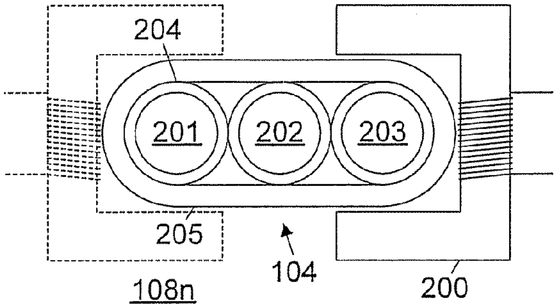
FIGS. 2A through 2D are diagrams of configurations for inductive coupling of downhole signaling units to a flat three phase power cable according to various embodiments of the present invention.
Figure 2B:
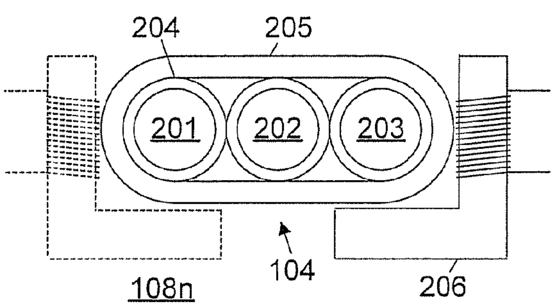
Figure 2C:
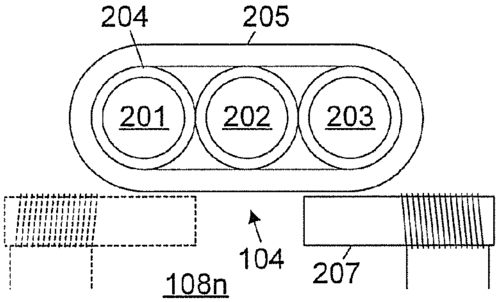
Figure 2D:
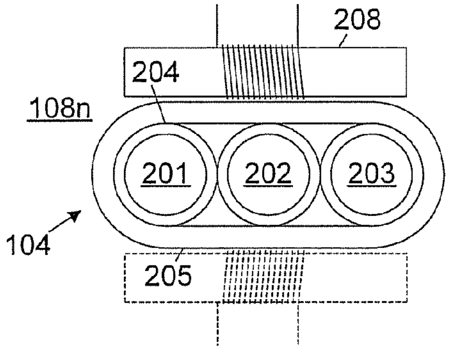
Figure 3:
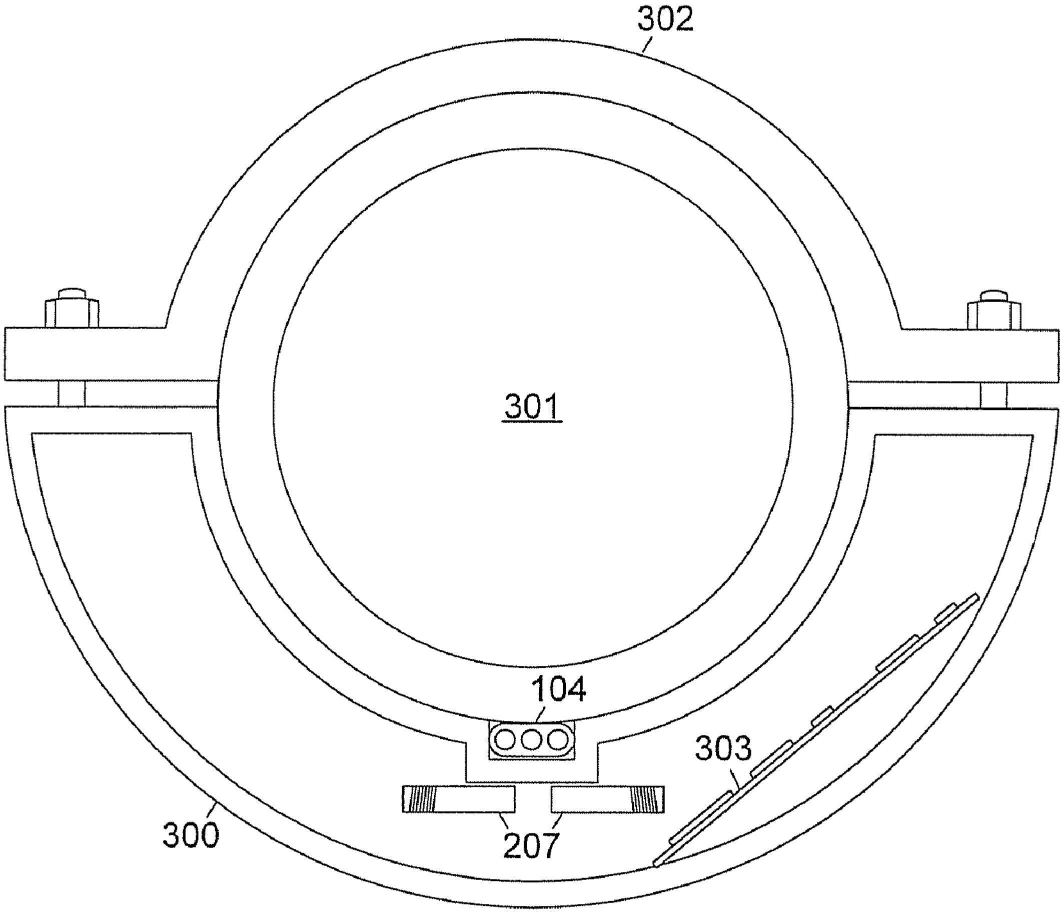
FIG. 3 depicts positioning of an inductive coupling device relative to a flat portion of a power cable within production tubing according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a borehole production system including downhole measurement and/or control units inductively coupled to a three phase power cable according to one embodiment of the present invention. Borehole production system 100 includes an electrical submersible pumping assembly 101 having a pump 120 and motor 122 shown lowered into a borehole 102 using a production tubing string 103. A three-phase power cable 104 carries three-phase power into the borehole 102 to the motor 122 within assembly 101 from a surface location.

At the surface, a three-phase power source 105, such as a generator or a connection to a local power grid, is coupled to power cable 104 by a converter/inverter system 106. Converter/inverter system 106 is constructed and operates in a manner known in the art to operate and/or regulate the operating speed of the motor/pump assembly.

Those skilled in the art will recognize that the complete structure and operation of a borehole production system is not depicted in the drawings or described herein. Instead, for simplicity or clarity, only so much of the borehole production system as is unique to the present invention or necessary for an understanding of the present invention is depicted and described.

At least a portion of three phase power cable 104 is flat. In fact, generally only a portion of the three phase power cable 104—the "motor lead" piece transmitting power around the pump 120 within the production string—will be flat. The conductors for each phase within any three phase power transmission cable, flat or round, are generally in relatively close proximity. In round cables, each conductor, as seen from a cross-section, is spaced an equal distance from the other two at the apex of an equilateral triangle. As a result, the variations in external magnetic fields produced by instantaneous currents (or the differential magnetic field resulting from individual currents) may not be of sufficient magnitude to draw power by inductive coupling.

However in flat three phase cables or cable segments, the conductors, as seen from a cross-section, all lie within a common plane. The distance between each end conductor and the remaining two conductors (the center conductor and the other end conductor) is different. Currents within the other two conductors therefore have disparate inductive effects on the end conductors. Due to the significant separation in influence from the other two conductors, variations in the total magnetic field accessible near an end conductor is intensified, making access to power by inductive coupling viable.

In many applications, such as downhole motor applications where casing and tubing dimensions do not leave enough room for round cable, use of flat cable is imperative, or at least highly desirable. In addition to dimensional considerations, logistics or splicing concerns may drive the use of flat cable. Even where round cable is employed for power transmission, in ESP systems a "motor lead" piece of flat cable is normally spliced to the round cable above the pump to run power past the pump to the motor. Thus at least a section of flat cable is typically available in the three phase power transmission system for an ESP.

In the present invention, at least a portion of three phase power cable 104 is flat. Alternatively, the entire three phase power cable 104 may be a flat cable, connected to a system inductance balancer 107 of the type described in U.S. Pat. No. 6,566,769.

A number of data measurement or control signaling units 108*a*-108*n*, which may be transmitters, receivers, or transceivers (hereinafter collectively referred to as "signaling units"), are optionally positioned proximate to power cable 104 at various locations along the length of that cable. Signaling units 108*a*-108*n* may be located, for example, at the surface, at the wellhead (particularly for subsea wells), at or near a packer, at various intervals within the well, and/or at the top of the motor/pump assembly 101. Signaling units 108*a*-108*n* are constructed, disposed and oriented relative to the conductors of cable 104, of flat segments of cable 104, as described in further detail below. At a minimum, at least one signaling unit 108*n* having such construction, disposition and orientation is positioned proximate to a motor lead segment of cable 104 or another flat portion of cable 104.

In addition, a data logging and/or control surface system 109 is coupled to one or more conductors of power cable 104, for receiving or transmitting signals to measurement and/or control units 108*a*-108*n*. Signaling units 108*a*-108*n* may measure pressure, temperature, cut, flow rate, or other parameters, and/or may control valves or other downhole mechanical systems. Signaling units 108*a*-108*n* may be configured to communicate bi-directionally with surface system 109, either alone (one at a time) or concurrently, and may transmit or receive signals over three phase cable 104 concurrently with the three phase power transmitted to drive motor/pump assembly 101. Based on measurements returned by signaling units 108*a*-108*n* to surface system 109, surface system 109 controls operation of the production system, including varying the speed of the motor 122, opening and closing valves, etc.

In the present invention, signaling units 108*a*-108*n* are inductively coupled to the conductors of a flat segment within power cable 104 for the purposes of (a) transmitting or receiving signals over such conductors, and/or (b) drawing power from three phase power cable 104 as described in further detail below. As known in the art, filters may be required within signaling units 108*a*-108*n* and surface system 109 to filter the three phase power transmitted over power cable 104 concurrently with data measurement or control signals.

FIGS. 2A through 2D are diagrams of configurations for inductive coupling of a signaling unit to conductors for a flat three phase power cable segment according to various embodiments of the present invention. To avoid having to pierce the cable armor for three phase cable 104, at least one signaling unit 108*n* is inductively coupled to the three phase cable 104, physically accessing the magnetic field produced by current carried on the conductor to inductively receive power from three phase cable 104, and impressing signals upon or detecting signals from three phase cable 104 by similar use of a magnetic field producing current(s) within the conductor(s). Different configurations of the inductive coupling mechanism, and different positions relative to the conductors of the three phase power cable 104, are better suited to receiving power and signaling.

FIG. 2A is a diagram for the structure and orientation of an inductive coupling device 200 for inductively coupling signaling unit 108*n* to a flat segment within three phase cable 104 for the purpose of drawing power from the three phase power transmitted on the cable 104. Flat cable 104 (or a flat segment within cable 104) includes conductors 201-203 aligned in a plane, with conductors 201 and 203 on the ends and conductor 202 in the center. Each conductor 201-203 is surrounded by insulation 204, with the three conductors 201-203 and the insulation surrounded by armor 205.

For receiving power from cable 104, a inductive coupling device 200 including a generally C-shaped core with a winding around at least a portion thereof is disposed around one of the end conductors 201 or 203. The core is preferable magnetic and/or has a high magnetic permeability.

The strength of the magnetic field created by three phase power transmitted on cable 104 shows greater magnitude or variance on end conductors 201 or 203 than on center conductor 202, or on any conductors within a round three phase cable. This allows physical access to the magnetic field produced by the current on that end conductor—for instance, conductor 201—with a significant separation from the influence of the current carried on the other conductors 202 and 203'. The separation of influence from the other conductors 202-203 intensifies the total magnetic field variations proximate to the conductor 201 and thus enhances the amount of power that is accessible.

The C-shape of the core is sized to substantially surround the conductor 201 or 203, preferably without significantly overlapping center conductor 202. The winding may cover substantially all of the core or only a portion thereof. Counterpart inductive coupling devices 200 within a given signaling device 108*n* may be disposed around both end conductors 201 and 203. The electrical current produced by the inductive coupling device 200 may be rectified, transformed and/or changed in frequency by electronics (not shown) for use within other functional components in signaling unit 108*n*.

FIGS. 2B and 2C are alternative configurations an inductive coupling device for inductively coupling signaling unit 108*n* to a flat segment of three phase cable 104 for the purpose of drawing power from the three phase power transmitted on the cable 104. Rather than a C-shaped core and/or winding surrounding the end conductor 203 on three sides, an L-shaped core and/or winding 206 as illustrated in FIG. 2B or a straight core and/or winding 207 as illustrated in FIG. 2C may be employed. As long as the core and/or winding do not extend significantly beyond an end conductor to overlap a portion of a center conductor, any configuration providing physical access to the magnetic field produced by current within an end conductor may be employed. Those skilled in the art will recognize that accessing only the magnetic field produced by current in one conductor is not feasible for a three conductor cable carrying three phase power, but that magnetic effects from other conductors become negligible the further the core is space from that conductor.

It should be noted that the C-shaped and L-shaped cores may optionally be continuously curved to, for example, follow the exterior contour of the armor, rather than being formed from straight segments. The terms "C-shaped" and "L-shaped" are intended generally to differentiate between a core disposed proximate to three or two orthogonal "sides", respectively, of an end conductor (e.g., surrounding a periphery encompassing an angle of approximately either 270° or 180°), without strictly limiting acceptable geometric shapes. Thus, for example, the inductive device may be implemented by a semi-circular toroid. Similarly, a "straight" core may be implemented with different geometric shapes having a portion disposed proximate to only one "side" of an end conductor. In all case, the winding need not be around the portion of the core that is closest to the end conductor, but may be spaced apart from the end conductor.

FIG. 2D is a diagram of the structure and orientation of an inductive coupling device for inductively coupling signaling unit 108*n* to a flat segment of three phase cable 104 for the purpose of impressing signals on and/or detecting signals from the flat cable 104 or a flat segment within cable 104. Inductive coupling device 208 includes a generally straight (e.g., cylindrical, or elongate with a square or rectangular cross-section) core with a winding around at least a portion thereof, and is disposed substantially parallel to the plane containing the conductors 201-203, oriented transverse (across) the conductors 210-203. As with the other inductive devices 200, 206 and 207, the winding need not be around the portion of the core closest to the conductors within the cable.

Data and/or control signals are preferably impressed on all three conductors, as a single transmission medium, by either surface system 109 or any of signaling units 108*a*-108*n*. Accordingly, the core is preferably sized to a length substantially equal to at least a distance across all conductors 201-203. The winding may cover substantially all of the core or only a portion thereof. Similar to inductive coupling devices 200, 206 and 207, counterpart inductive coupling devices may be disposed on both sides of conductors 201-203 within a given signaling unit 108*n*. The electrical signal received from or driven through the inductive coupling device 208 may be filtered, transformed and/or amplified as necessary within signaling unit 108*n*.

Each signaling unit 108*a*-108*n* may include both inductive coupling device(s) 200/206/207 and inductive coupling device(s) 208, appropriately connected to different portions of electronics (not shown) therein and disposed proximate to different flat segments of cable 104. When both devices 200/206/207 and 208 are employed within a given unit 108*a*-108*n*, the devices 200/206/207 and 208 should be sufficiently spaced to avoid interference.

In addition, each unit 108*a*-108*n* may include a number of either device(s) 200/206/207, device(s) 208, or both, the respective devices of a given type (for drawing power or impressing/detecting signals) operating in parallel to increase the amount of power drawn or to improve signal impression or detection.

FIG. 3 depicts positioning of an inductive coupling device relative to a flat portion of a power cable along a production tubing string according to one embodiment of the present invention. In the example shown, a pressure vessel 300 is secured to production tubing 301 by a clamp 302. Within a wall of pressure vessel 300 adapted to contact tubing 301, a channel is provided for a segment of flat three phase power cable. Inductive coupling devices 207 (in the example shown) are positioned relative to the end conductors within flat portion of cable 104 as described above, held in position by brackets (not shown) and electrically connected by wiring (also not shown) to electronics on circuit board 303 within the vessel 300.

The present invention allows effective coupling to a flat segment of a three phase power cable without piercing the cable armor and creating a point of potential failure. Power may be drawn from the cable and signals transmitted by inductive coupling to the power cable, using coupling device configured to take advantage of the cable cycle inductance variation in the manner best suited to the desired goal of either drawing power or transmitting signals.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A downhole submersible pumping system disposable in a wellbore comprising:

a pump;

a pump motor having a housing and coupled to the pump;

a shaft coupling the pump to the pump motor;

a flat three-phase power cable in electrical communication with the motor to transmit three-phase power thereto, the power cable comprising three insulated conductors each conducting electricity having a different phase and positioned within a protective cable armor containing the insulated conductors therein, the insulated conductors comprising first and second end conductors separated by a center conductor aligned within the protective cable armor to provide a flat profile;

an inductive coupling device adjacent the power cable, the inductive coupling device comprising:

a first core having a first winding surrounding at least a portion of the first core and positioned external to the protective cable armor adjacent the first end conductor and spaced apart from the center and second end conductors, the first winding inductively coupled to the first end conductor to provide electrical power to a signaling unit when three-phase electrical power is applied to the three-phase power cable, and a second core having a second winding surrounding at least a portion of the second core and positioned external to the protective cable armor adjacent the second end conductor and spaced apart from the center and first end conductors, the second core also spaced apart from the first core, the second winding inductively coupled to the second end conductor to provide electrical power to the signaling unit when three-phase electrical power is applied to the three-phase power cable; and the signaling unit in electrical communication with the power cable via the inductive coupling device and configured so that when three-phase electrical power is transmitted through the power cable, the signaling unit receives power from an inductive coupling with a first magnetic field generated around the first end conductor and a second magnetic field generated around the second end conductor, and receives data signals, transmits data signals, or both receives and transmits data signals through an inductive coupling.

2. The system of claim 1, further comprising production tubing connected to the pump, wherein the signaling unit is in sensing communication with the production tubing.

3. The system of claim 1 further comprising a surface system coupled to the signaling unit via the power cable.

4. The system of claim 3, wherein the surface system comprises a data logging system.

5. The system of claim 1, wherein the inductive coupling device is configured to communicate energizing electrical power from the power cable to the signaling unit and transfer data signals between the power cable and the signaling unit.

6. A downhole submersible pumping system disposable in a Wellbore, comprising:

a pump;

a pump motor having a housing and coupled to the pump;

a power cable in electrical communication with the motor, the power cable delivering three phases of electrical power, the power cable comprising three insulated conductive wires each conducting electricity having a different phase than that of each other and positioned within a protective cable armor containing the insulated conductive wires therein;

an inductive coupling device adjacent the power cable, the inductive coupling device having a core positioned external to the protective cable armor and being in magnetic communication with one of the conductive wires in the power cable to provide power to a signaling unit; and the signaling unit in electrical communication with the inductive coupling device, so that when electrical power is transmitted through the one of the conductive wires, a magnetic field associated therewith generates an electrical current in the inductive coupling device to power the signaling unit.

7. The system of claim 6, wherein the core is disposed closer to the one of the conductive wires than each of the other conductive wires so that effects of magnetic fields associated with the other conductive wires are negligible with respect to effects of the magnetic field of the one of the conductive wires on the core.

8. The system of claim 7, wherein the one of the conductive wires is a first conductive wire and the conductive wires are disposed so that the first conductive wire and a second conductive wire are separated by a center conductive wire;

wherein the core is a first core having a first winding disposed proximate to the first conductive wire; and wherein the inductive coupling device further comprises a second core positioned external to the protective cable armor and having a second winding proximate to the second conductive wire to also provide power to a signaling unit, the second conductive wire producing a second magnetic field in the second core of the inductive coupling device, the second core being isolated from the first core so that effects on the second core of a magnetic field generated by the first conductive wire are negligible with respect to effects on the second core of a magnetic field generated by the second conductive wire.

9. The system of claim 6, further comprising:

production tubing connected to the pump; and wherein the signaling unit is in sensing communication with the production tubing and may measure pressure, temperature, cut or flow rate.

10. The system of claim 9, further comprising:

a surface system inductively coupled to the signaling unit via the power cable; and wherein the surface system comprises a data logging system to log data collected from the signaling unit.

11. The system of claim 6, further comprising:

a surface system inductively coupled to the signaling unit via the power cable; and wherein the signaling unit is configured to control a control valve, that is controlled by the surface system using a signal modulated onto the one of the conductive wires.

12. The system of claim 6, wherein the inductive coupling device is configured to communicate energizing electrical power from the power cable to the signaling unit and transfer data signals between the power cable and the signaling unit.

13. A method of producing hydrocarbons from a wellbore using a submersible pumping system, the system comprising a pump, a pump motor coupled to the pump, a three phase power cable having a protective cable armor and containing a plurality of conductive wires, and a signaling unit, the method comprising the steps of:

energizing the pump motor using electrical power from the power cable, the power cable delivering three-phase electrical power with each phase being carried by a separate one of the plurality of conductive wires;

generating electrical power via the use of an inductive coupling device positioned external to the protective cable armor and having a core inductively coupled to one conductive wire of the plurality of conductive wires, the inductive coupling of the core substantially using a magnetic field generated by the one of the plurality of conductive wires so that effects on the core by the magnetic fields generated by the other of the plurality of conductive wires are negligible with respect to effects on the core of the magnetic field generated by the one of the plurality of conductive wires; and powering a signaling unit connected to the inductive coupling device using the electrical power generated by the inductive coupling of the core with the magnetic field generated by the one of the plurality of conductive wires.

14. The method of claim 13, further comprising transmitting data from the signaling unit to the power cable via the inductive coupling.

15. The method of claim 13, wherein the system further comprises a data logging system disposed at the wellbore surface, the method farther comprising transmitting signaling unit data to the data logging system along the power cable.

16. The method of claim 13, wherein the conductive wires are arranged parallel in a plane, and wherein the inductive coupling comprises a core assembly having a pair of cores each having a winding disposed proximate to a separate one of the conductive wires.

17. The method of claim 16, wherein the core assemblies have shapes selected from the list consisting of "C" shaped, "L" shaped, and elongated shaped.

* * * * *